M. JOHNSON.
POTATO DIGGER AND CULTIVATOR.

No. 96,007. Patented Oct. 19, 1869.

Witnesses,
E. W. Anderson,
D. D. Kane

Inventor
Moses Johnson
Chipman, Hosmer, & Co
Attorneys.

United States Patent Office.

MOSES JOHNSON, OF THREE RIVERS, MICHIGAN.

Letters Patent No. 96,007, dated October 19, 1869.

IMPROVEMENT IN POTATO-DIGGER AND CULTIVATOR.

The Schedule referred to in these Letters Patent and making part of the same.

*To all whom it may concern:*

Be it known that I, MOSES JOHNSON, of Three Rivers, in the county of St. Joseph, and State of Michigan, have invented a new and valuable Improvement in Potato-Diggers and Cultivators; and I do hereby declare that the following is a full, clear, and exact description of the construction and operation of the same, reference being had to the annexed drawings, making a part of this specification, and to the letters and figures of reference marked thereon.

Figure 1:
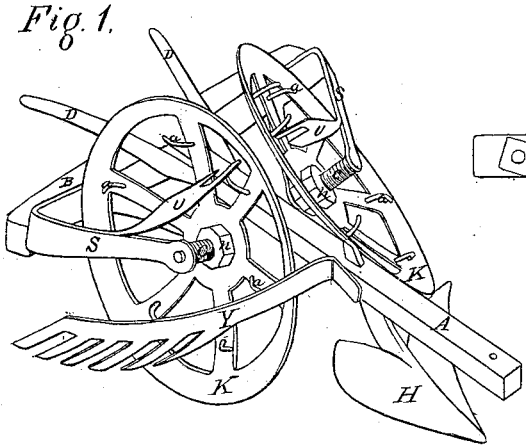

Figure 1, of the drawings, is a representation of my invention in perspective.

Figure 2:
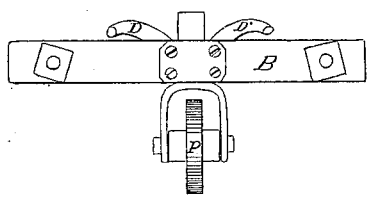
Figure 3:
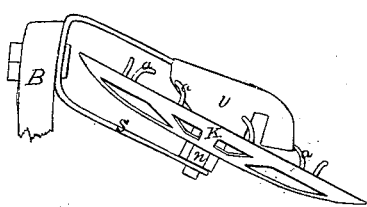

Figure 2 is a rear view of transverse bar and caster.

Figures 3, 4, 5, and 6, are details.

My invention has relation to potato-diggers and cultivators; and

It consists mainly in a novel arrangement of devices, intended to serve as an efficient digger or cultivator, at the will of the operator.

The letter A, of the drawings, represents the neap or beam of my apparatus, and

Letter B, the cross-bar, to which said beam is attached.

The letters D are handles, by which the machine is guided.

Figure 4:
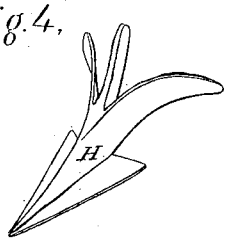

The letter H represents my plow or separator, a modification of which is shown in fig. 4.

The letters K are concave wheels, having hooks in their respective spokes or arms, represented by the letters a.

These wheels are arranged in staples marked S, and are made adjustable therein by means of the screws c, that serve as axles, and the nuts n operating thereon.

It will be observed that the wheels K are arranged in the apparatus in positions diagonal to each other. I call these wheels the shakers, when used for digging potatoes.

The staples S are respectively attached to the front side of the cross-bar B, by bolts, that pass through them and said bar, and which are held in place by suitable threads and nuts on the rear side of said beam.

By this arrangement, I am enabled to secure said staples in any desirable position, and thereby to adjust the shakers in the proper angle for the work required.

The hooks a serve as aids in shaking the earth from the potato, and also as pulverizers of the soil.

The letters v represent scrapers, arranged upon the staples, as shown, and which serve to scrape the earth from the shakers.

The letter Y is a shield or rake, attached to the beam and extending rearward, as shown.

This device is constructed with teeth, that serve as a rake, for the ground, and aid in separating the earth from the potatoes, while at the same time, the solid body of the same, in conjunction with the teeth, serves to keep vines and other incumbrances from the wheels.

I usually place one of these rakes on each side of the beam.

The letter P represents a caster, made adjustable upon the cross beam, and serves to regulate the depth of the furrow I desire to cut.

Figure 5:
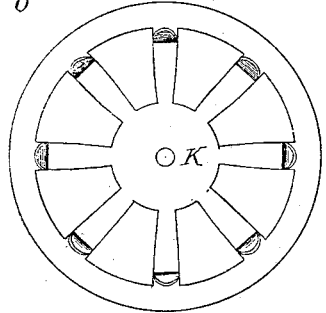
Figure 6:
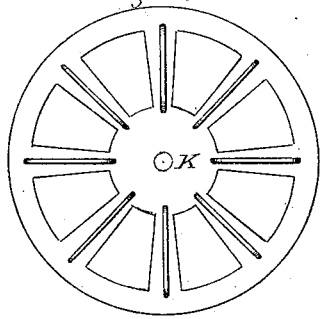

Modifications of my scrapers are shown in figs. 5 and 6.

What I claim as my invention, and desire to secure by Letters Patent, is—

1. The concave wheels K, with their hooks a, staples S, and scrapers v, screws c, and nuts n, when constructed and arranged to operate substantially as specified.

2. The shields Y, in combination with the wheels K and beam A.

3. The potato-digger herein described, having adjustable concave wheels K, plow H, staples S, shield Y, and caster P, constructed and arranged to operate substantially as specified.

In testimony that I claim the above, I have hereunto subscribed my name, in the presence of two witnesses.

MOSES JOHNSON.

Witnesses:
JNO. S. MOWREY,
DAN. TENNYSON.